(12) United States Patent
Yang et al.

(10) Patent No.: US 6,291,599 B1
(45) Date of Patent: Sep. 18, 2001

(54) MODIFIER AND A METHOD FOR IMPROVING THE FLEXIBILITY OF A CURED EPOXY RESIN

(75) Inventors: Jeng-Cheng Yang, Tao-Yuan; Chen-Chi Martin Ma, Hsinchu; Hon-Bin Chen, Tao-Yuan, all of (TW)

(73) Assignee: Chung-Shan Institute of Science & Technology, Lung-Tan (TW)

( * ) Notice: Subject to any disclaimer, the term of this patent is extended or adjusted under 35 U.S.C. 154(b) by 0 days.

(21) Appl. No.: 09/459,503

(22) Filed: Dec. 13, 1999

(30) Foreign Application Priority Data

Dec. 14, 1998 (TW) ................................................ 087120767

(51) Int. Cl.$^7$ ............................ C08F 283/10; C08G 59/14
(52) U.S. Cl. ........................ 525/476; 525/457; 525/510; 525/931; 528/28

(58) Field of Search .................................... 525/476, 457, 525/510, 931; 528/28, 69

(56) References Cited

U.S. PATENT DOCUMENTS

4,707,529 * 11/1987 Hoffman et al. .
5,844,053 * 12/1998 Nishida .
5,962,139 * 10/1999 Hagiwara et al. .

* cited by examiner

Primary Examiner—Robert Dawson
Assistant Examiner—Marc S. Zimmer
(74) Attorney, Agent, or Firm—Jackson Walker L.L.P.

(57) ABSTRACT

The invention provides a technique for improving the flexibility of a cured epoxy resin. An isocyanate terminated polydimethylsiloxane urethane as a modifier is grafted to an epoxy resin. The modified epoxy resin after being cured exhibits an improved flexibility.

10 Claims, 1 Drawing Sheet

MODIFIER AND A METHOD FOR IMPROVING THE FLEXIBILITY OF A CURED EPOXY RESIN

FIELD OF THE INVENTION

The present invention is related to an epoxy resin having an improved flexibility and a lower internal stress after being cured.

BACKGROUND OF THE INVENTION

Due to the rapid development of the electronic and information industries in recent years, the new generation of semiconductor production processes demand the epoxy resin to have a high I/O (Input and Output Count) modulus, high heat resistance, high flowability, high physical properties, etc. Therefore, the studies on how to improve the flexibility and heat resistance of the epoxy resin become another essential field of research. The structure of a siloxane compound has properties such as good thermal stability and anti-oxidation property, good air permeability and electrical insulation property, maintaining softness, elasticity and flowability at a low temperature, good weather resistance, and low stress formation, etc. Therefore, such a structure is helpful to the improvement of flexibility and the reduction of stress formation.

In 1996, Chun-Shan Wang et al. [T. H. Ho, C. S. Wang, polymer, 37, 2722(1996)] produced thermoplastic polyurethane (TPU) by reacting various siloxane compound monomers of OH-terminated polydimethyl siloxane with isocyanate-containing monomers such as MDI or TDI in room temperature using dibutyltindilaurate-T12 as the catalyst. The reaction forms a thermoplastic polyurethane (TPU) with the main chain of which containing siloxane. The TPU of various structure is blended with an o-cresol formaldehyde novolac epoxy resin and then cured at 150° C. and 50 kgr/cm² for one hour, and at 180° C. and 210° C. for two and three hours, respectively. The results indicate that the cured article has a higher thermal resistance and a higher Thermal Shock Cycling Test value thereby improving the defects in the thermal resistance and the existence of internal stress existed the epoxy resin molding formulation for IC packaging.

The curing of an epoxy resin at a high temperature will cause the formation of a residual internal stress and brittleness. Relatively, polysiloxane has a lower degree of stress formation and a better flexibility. Therefore, the use of polysiloxane in improving the flexibility of epoxy resin has received a wide attention in the industry. However, there is a large difference in the solubility parameter between the polysiloxane and the epoxy resin thereby causing a severe phase separation and a non-uniform distribution of the polysiloxane in the epoxy resin. There are a wide variety of epoxy resins and their hardeners; and the reaction mechanisms thereof vary, as well. Therefore, the addition of a polysiloxane into any epoxy resin curing system will not unanimously achieve the property-modifying effects. The predominant factor affecting the improvement of flexibility is the improvement of the compatibility between the polysiloxane and the epoxy resin. Therefore, the increase of the molecular attractions between the polysiloxane and the epoxy resin can achieve this effect; and the formation of the hydrogen bonding is the most effective method in increasing the attractive force between two molecules.

The objectives of the present invention are to provide a polysiloxane urethane modifier and the use of the modifier in improving the flexibility of the epoxy resin and toughening the epoxy resin by grafting the modifier to an epoxy resin.

BRIEF DESCRIPTION OF THE INVENTION

The present invention discloses a modifier for improving the flexibility of the epoxy resin wherein the modifier has the following chemical structure (I):

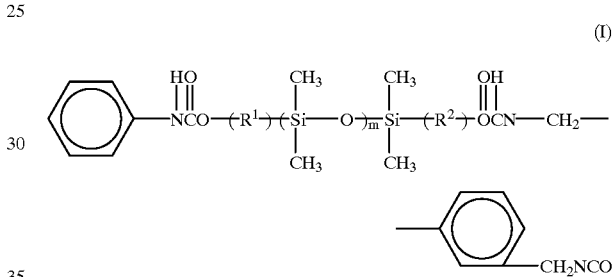

where
  m is an integer of $0<m<10$;
  $R^1$ is an alkyl having 1~7 carbons;
  $R^2$ is an alkyl having 1~7 carbons; preferably, m=5, $R^1$ and $R^2$ are $-(CH_2)_6-$.

The present invention also discloses an epoxy resin having a modifying side chain of a polysiloxane urethane group wherein the epoxy resin has the following chemical structure:

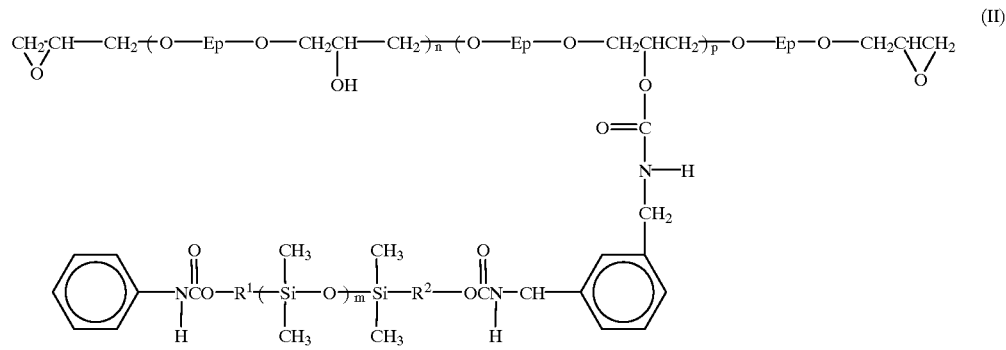

where:
  m is an integer of $0<m<10$,
  p/n is between $1/100$ and $25/100$, and $0<n, p<1$;
  $R^1$ is an alkyl having 1~7 carbons;

$R^2$ is an alkyl having 1~7 carbons;
Ep is

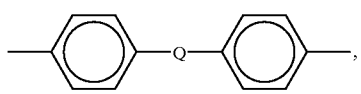

where

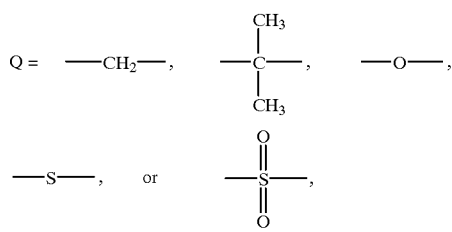

or Ep is a novolac-type epoxy resin group having the following formula

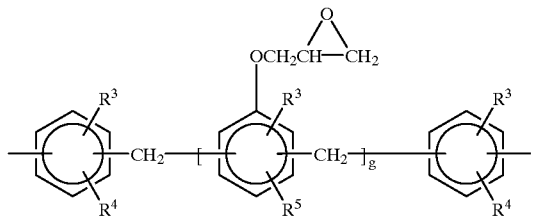

where $R^3$ is hydrogen or methyl, g is an integer of 1 to 6, $R^4$ and $R^5$ independently are hydrogen or

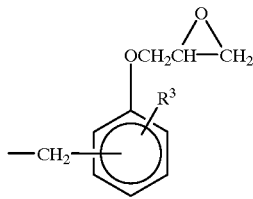

where $R^3$ has a same definition as the above. Preferably, m=5, $R^1$ and $R^2$ are $-(CH_2)_6-$; and Q is $-C(CH_3)_2-$.

The present invention further discloses a method of preparing a modified epoxy resin, which comprises reacting a modifier as claimed in claim 1 with an epoxy resin of the following formula in a molten state:

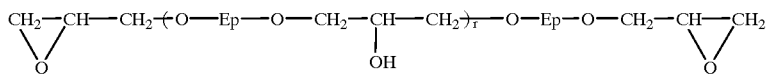

where:
0<r<1;
Ep is

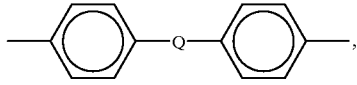

where

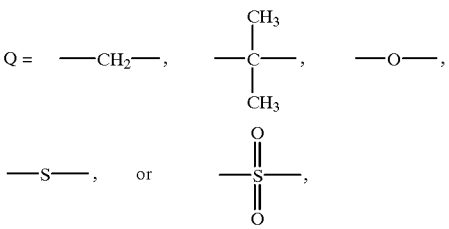

or Ep is a novolac-type epoxy resin group having the following formula

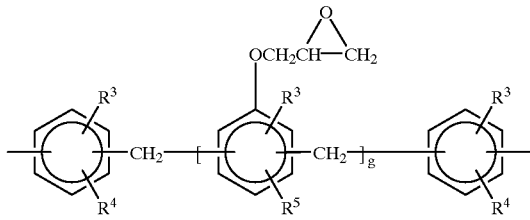

where $R^3$ is hydrogen or methyl, g is an integer of 1 to 6, $R^4$ and $R^5$ independently are hydrogen or

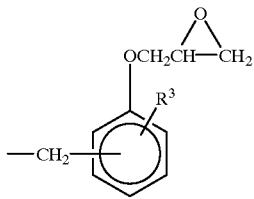

where $R^3$ has a same definition as the above wherein the reaction is carried out in an inert gas at a temperature of 80° C.–120° C.; and the amount of addition of the modifier as claimed in claim 1 is 1 phr to 30 phr (parts by weight per 100 parts by weight of the epoxy resin).

DETAILED DESCRIPTION OF THE PRESENT INVENTION

Figure 1:
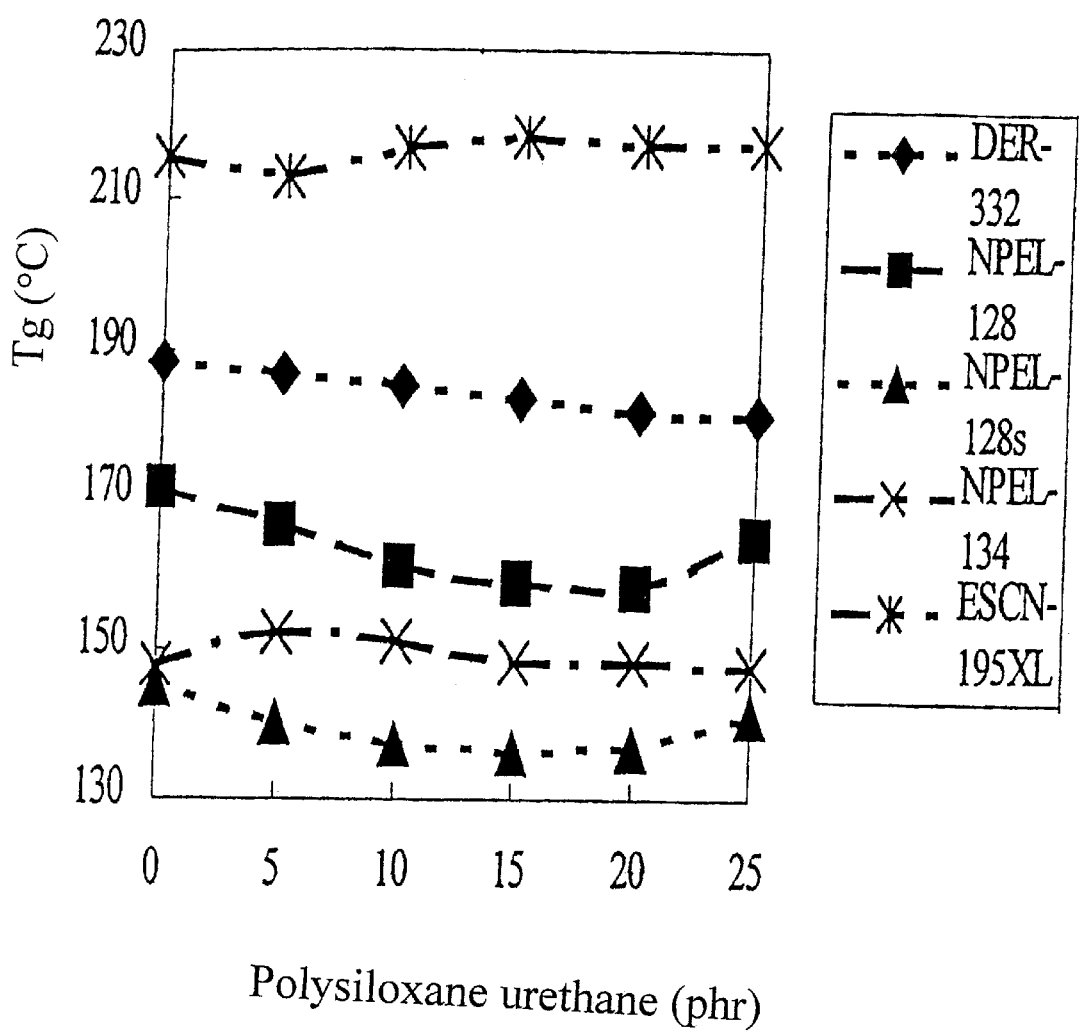
FIG. 1 is a plot showing the variation of Tg for various epoxy resins introduced with different amounts of a polysiloxane urethane modifier.

Due to its excellent softness and thermal stability, a polysiloxane is often used as one of the selections for the modifier of resins such as acrylic resins, epoxy resins and novolacs. However, the results are not quite satisfactory due to the incompatibility between the polysiloxane and these resins.

In order to improve the compatibility between the polysiloxane and the epoxy resin while maintaining the low viscosity and high flowability of the original polysiloxane, the present invention discloses an aliphatic-chain polysiloxane urethane modifier having an NCO functional terminal. The modifier is an NCO-terminated compound synthesized from an OH-terminated polydimethyl siloxane with a mixture of m-xylylene diisocyanate and phenylisocyanate in an equimolar ratio; i.e. the modifier is a polysiloxane urethane having an NCO end group. The modifier uses the OH-group on the epoxy resin to form a grafted polysiloxane-containing siloxane, and 0.35 g (0.24 mol) dibutyltin dilaurate were added to a four-neck reaction bottle equipped with a thermometer, a stirrer, a 50 ml feed tube and a condenser. 28.58 g (0.24 mol) phenyl isocyanate in the 50 ml feed tube was then added dropwise while stirring at room temperature. The temperature was increased to 80° C. when the addition of phenyl isocyanate was completed, and was maintained at that temperature for one hour and then cooled to room temperature. 45.15 g (0.24 mol) m-xylylene diisocyanate was quickly added to the cooled mixture via the 50 ml feed tube. After the addition, the mixture was heated to 80° C. for reacting 3 hours thereby obtaining a clear liquid product. The reaction formula is shown in the formula (1) as follows:

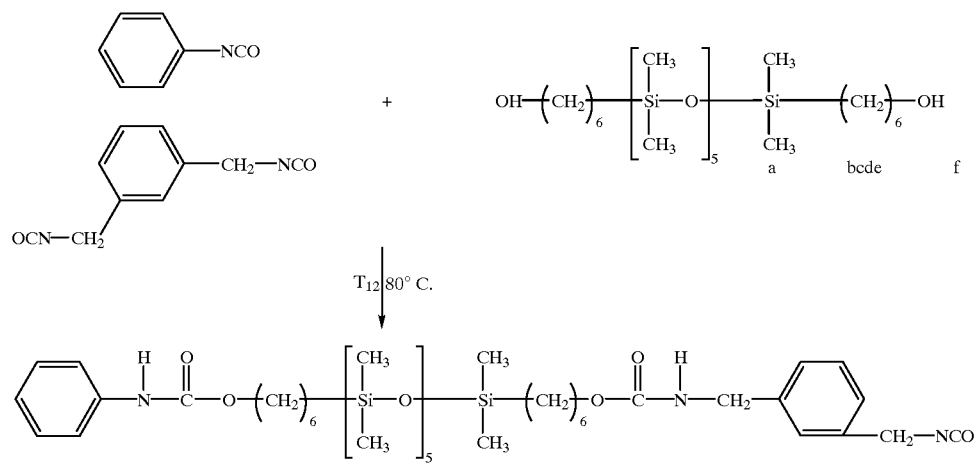

epoxy resin via its reaction with the NCO end group, and then use an increased intermolecular hydrogen bonds in the grafted polysiloxane-containing epoxy resin to improve the compatibility between the polysiloxane and the epoxy resin.

The present invention can use a novolac-type epoxy resin or a bisphenol A type epoxy resin (such as diglycidyl ether of bisphenol A, DGEBA) to form a hot melt with the polysiloxane urethane thereby blending the polysiloxane urethane and the epoxy resin to improve the flexibility of the epoxy resin.

The present invention also discloses a cured polysiloxane urethane-modified epoxy resin by using a hardener such as MDA (4,4'-methylene dianiline). The experimental data indicate that, after curing, the polysiloxane urethane group has a substantial influence on the physical properties of the cured resin and can conspicuously improve the flexibility of the epoxy resin.

EXAMPLE 1

(Preparation of epoxy resin modified by a polysiloxane urethane modifier)

(1) 200.31 g (0.24 mol) of OH-terminated polydimethyl

This clear liquid product, when measured at 25° C., has a specific volume of 0.98634 and a viscosity of 7560 cp. An IR spectrum of the OH-terminated polydimethyl siloxane reactant shows that it has an OH-group absorption peak at 3380 cm$^{-1}$ and siloxane-group absorption peaks at 1260 cm$^{-1}$ 1090 cm$^{-1}$ and 800 cm$^{-1}$. When it reacted with the isocyanate group to form the product, an IR spectrum thereof shows urethane-group absorption peaks at 3348 cm$^{-1}$ (—NH, stretching), 2275cm$^{-1}$ (—NCO$_2$, stretching) and 1710 cm$^{-1}$ (C=O, stretching) and an isocyanate-group absorption peak at 2275 cm$^{-1}$. From H$^1$-NMR spectrum (CDCl$_3$, 300 MHz) of the OH-terminated polydimethyl siloxane reactant, a in the formula (1) appears at about 0.04 ppm, b appears at about 0.50 ppm and is splitted into three peaks under the influence of the hydrogen atoms on the adjacent carbon, c appears at about 1.31 ppm, d appears at about 1.51 ppm, e appears at about 3.60 ppm under the influence of the OH-group and is splitted into three peaks under the influence of the hydrogen atoms on the adjacent carbon, and f appears at about 1.69 ppm. In this example methanol was used to react with the product prior to the H$^1$-NMR analysis. The structure of the resulting product is shown as follows:

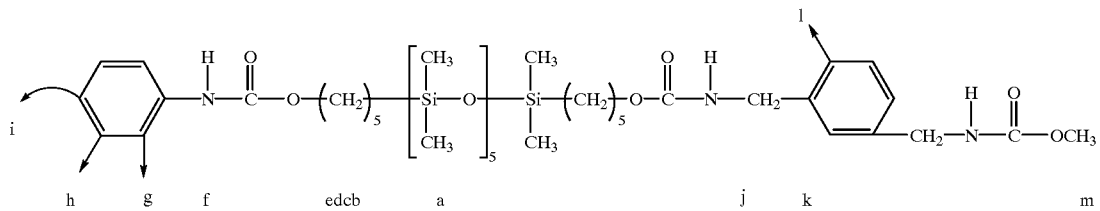

It can be seen from the H[1]-NMR analysis of the above compound that f of the OH-group in the original polysiloxane, after reacted with the isocyanate, forms j and f of the urethane-group at about 5.03 ppm and about 6.62 ppm. The g, h and j of the hydrogens on the phenyl ring of the phenyl isocyanate separately appear at about 7.35 ppm and are splitted into two group of peaks under the influence of the hydrogen atom on the adjacent carbon, wherein those at about 7.30 ppm are splitted into two peaks under the influence of the hydrogen atom on the adjacent carbon, and those at about 7.00 ppm are splitted into three peaks under the influence of the hydrogen atom on the adjacent carbon. The hydrogen I of the phenyl ring on m-xylylene diisocyanate appears at about 7.16 ppm, the hydrogen k of the methylene on m-xylylene diisocyanate appears at about 3.69 ppm, and the hydrogen rn of the methyl on the methanol reacting with the reactive isocyanate group appears at about 4.32 ppm.

EXAMPLE 2

(Preparation of NCO-terminated polysiloxane urethane modifier)

Add 200 g of an epoxy resin and 20 g of an NCO-terminated polysiloxane urethane modifier (Example 1) into a 500 ml four-neck reaction bottle mounted with a thermometer, a stirrer and a condenser to carry out the reaction at 110° C. for one hour thereby obtaining a lactiferous liquid product. The reaction thereof can be shown as the following formula (2):

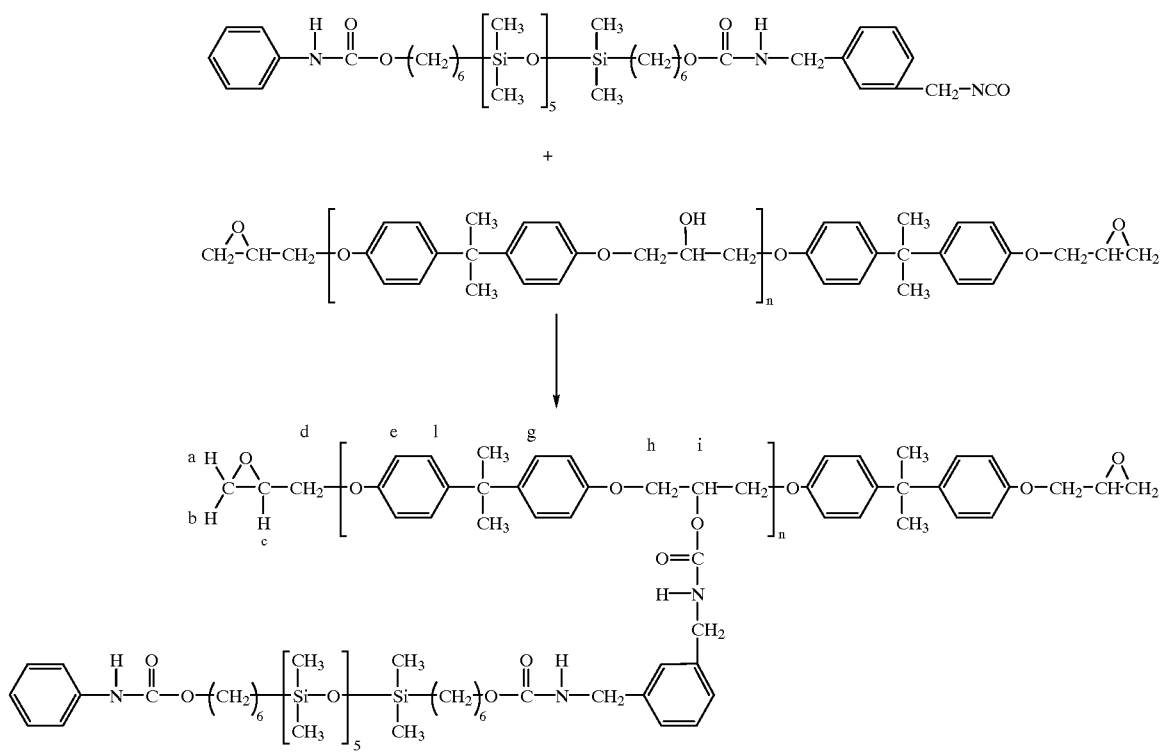

(2)

The IR spectrum of the epoxy resin clearly indicates that the absorption peak of the isocyanate group of the original isocyanate-containing polysiloxane urethane at 2275cm$^{-1}$, after reacted with the OH group of the epoxy resin, disappear completely and absorption peaks at 3348 cm$^{-1}$ (—NH, stretching), 2275 cm$^{-1}$ (—NCO, stretching) and 1710 cm$^{-1}$ (C=O, stretching) of an urethane group appear. The absorption peaks of the siloxane group of the polysiloxane appears at 1260 cm$^{-1}$, 1090 cm$^{-1}$ and 800 cm$^{-1}$; and the epoxy group appears at 1253 cm$^{-1}$, 919 cm$^{-1}$ and 834cm$^{-1}$. From the results of H$^1$-NMR (CDCl$_3$, 300 MHz) analysis, Ha on the epoxy functional group in the formula (2) appears at about 4.18 ppm and is splitted into two peaks under the influence of the hydrogen atoms on the adjacent carbon, the Hb appears at about 4.15 ppm and is splitted into two peaks under the influence of the hydrogen atoms on the adjacent carbon, Hc appears at about 3.32 ppm, Hd appears at about 3.92 ppm and is splitted into four peaks under the influence of the hydrogen atoms on the adjacent carbon, Hh belonging to the epoxy resin homologue appears at about 2.72 ppm, Hi appears at about 2.86 ppm; He belonging to the bisphenol structure appears at about 7.14 ppm and is splitted into two peaks under the influence of the hydrogen atoms on the adjacent carbon, Hf appears at about 6.80 ppm and is splitted into two peaks under the influence of the hydrogen atoms on the adjacent carbon, Hg appears at about 1.63 ppm; the positions of H atoms on the polysiloxane urethane side chain structure are similar to the positions of the H atoms on the $H^1$-NMR spectrum of the isocyanate-terminated polysiloxane urethane.

EXAMPLE 3
(Preparation of epoxy resins modified with different amounts of polysiloxane urethane, and the curing thereof)

(1) Modifying a DGEBA epoxy resin DER-332 (Dow Chemicals Co., epoxy equivalency (g/eq): about 170) and curing the same The epoxy resin DER-332 was dehydrated under vacuum at 120° C. for 6 hours. Accurately measured the epoxy resin DER-332 and the polysiloxane urethane to separately prepare the polysiloxane urethane-modified epoxy resins having 0, 5, 10, 15, 25 phr of the polysiloxane urethane (parts by weight per 100 parts by weight of the epoxy resin DER-332) by melting the mixture at 100° C. for 2 hours under an atmosphere of nitrogen gas. After the obtained polysiloxane urethane-modified epoxy resins were cooled off, 29.15 phr MDA in a molten state at 100° C. was separately added thereto. The mixtures were homogeneously mixed at 80° C. and vacuumed for 5 minutes, and then separately injected into a mold at 160° C. and kept at a constant temperature for three hours to complete the curing.

(2) Modifying a DGEBA epoxy resin NPEL-128 (Nan Ya Plastics Co., Taiwan, epoxy equivalency (g/eq): about 188) and curing the same The procedures of modifying the epoxy resin DER-332 and curing thereof in (1) were repeated except that the epoxy resin DER-332 was replaced by the epoxy resin NPEL-128 and 26.33 phr MDA was used instead of 29.15 phr.

(3) Modifying a DGEBA epoxy resin NPEL-128s (Nan Ya Plastics Co., Taiwan, epoxy equivalency (g/eq): about 215) and curing the same The procedures of modifying the epoxy resin DER-332 and curing thereof in (1) were repeated except that the epoxy resin DER-332 was replaced by the epoxy resin NPEL-128s and 23.02 phr MDA was used instead of 29.15 phr.

(4) Modifying a DGEBA epoxy resin NPEL-134 (Nan Ya Plastics Co., Taiwan, epoxy equivalency (g/eq): about 250) and curing the same The procedures of modifying the epoxy resin DER-332 and curing thereof in (1) were repeated except that the epoxy resin DER-332 was replaced by the epoxy resin NPEL-134 and 19.80 phr MDA was used instead of 29.15 phr.

(5) Modifying a novolac epoxy resin ESCN-195XL (Sumitomo Co., Japan, epoxy equivalency (g/eq): about 200) and curing the same The procedures of modifying the epoxy resin DER-332 and curing thereof in (1) were repeated except that the epoxy resin DER-332 was replaced by the epoxy resin ESCN-195XL and 24.75 phr MDA was used instead of 29.15 phr.

The cured epoxy resins in Examples 1 to 5 were subjected to thermal and mechanical strength analyses, and the results are shown and discussed in the following text.

FIG. 1 shows Tg of various epoxy resins incorporated with different amounts of the polysiloxane urethane modifier. It can seen from FIG. 1 that the Tg of the cured resins of the DGEBA epoxy resins modified with the polysiloxane urethane modifier decreases compared to that of the unmodified DGEBA epoxy resins. The Tg of the cured resins of the Novolac type epoxy resin ESCN-195XL in general will increase along with the increase of the amount of the modifier used.

Table 1 shows the variation of the flexural strength and the flexural modulus of various epoxy resins introduced with different amounts of the polysiloxane urethane, wherein the flexural strength and the flexural modulus were measured by using an universal tester.

TABLE 1

| Epoxy resin | (MPa) | Amount of polysiloxane urethane introduced (phr) | | | | | |
|---|---|---|---|---|---|---|---|
| | | 0 | 5 | 10 | 15 | 20 | 25 |
| DER 332 | flexural strength | 62.53 | 62.71 | 56.45 | 53.33 | 51.90 | 40.95 |
| | flexural modulus | 1958.8 | 1604.1 | 1543.1 | 1424.4 | 1398.1 | 1296.5 |
| NPEL 128 | flexural strength | 82.01 | 83.52 | 84.36 | 77.97 | 70.27 | 66.71 |
| | flexural modulus | 2085.3 | 1979.7 | 1965.6 | 1821.8 | 1726.2 | 1562.5 |
| NPEL 128s | flexural strength | 97.76 | 95.28 | 86.55 | 72.88 | 69.69 | 66.22 |
| | flexural modulus | 2320.1 | 2120.6 | 2081.3 | 1635.9 | 1599.8 | 1541.9 |
| NPEL 134 | flexural strength | 73.69 | 78.20 | 70.38 | 68.85 | 67.02 | 65.8 |
| | flexural modulus | 2145.5 | 1854.6 | 1727.7 | 1659.2 | 1570.5 | 1440.9 |
| ESCN 195XL | flexural strength | 52.23 | 49.71 | 45.29 | 48.36 | 32.23 | 26.52 |
| | flexural modulus | 2459.6 | 2331.8 | 2240.0 | 2043.5 | 1551.8 | 1402.3 |

Table 1 clearly indicates that:
(1) When the epoxy resin substrate is DER-332 and the amount of the polysiloxane urethane introduced is 5 phr, the flexural strength of the cured resin increases 1.003 times of the original resin substrate, and the flexural modulus decreases to 0.819 times of the original resin substrate.
(2) For improving the flexibility of the DGEBA type epoxy resin NPEL-128 modified by the polysiloxane urethane and reducing the internal stress thereof, the optimum amount of the polysiloxane urethane introduced is 10 phr wherein the impact strength increases 8.4% over that of the original resin, and the internal stress (T>Tg) reduces 12.9% over that of the original resin substrate.
(3) For improving the flexibility of the DGEBA type epoxy resin NPEL-128s modified by the polysiloxane urethane and reducing the internal stress thereof, the optimum amount of the polysiloxane urethane introduced is 5 phr wherein the impact strength increases 5.6% over that of the original resin.
(4) For improving the flexibility of the DGEBA type epoxy resin NPEL-134 modified by the polysiloxane urethane and reducing the internal stress thereof, the optimum amount of the polysiloxane urethane introduced is 10 phr wherein the impact strength increases 1.9% over that of the original resin, and the internal stress (T>Tg) reduces 36.3% over that of the original resin substrate.
(5) For improving the flexibility of the Novolac type epoxy resin ESCN-195XL modified by the polysiloxane urethane and reducing the internal stress thereof, the optimum amount of the polysiloxane urethane introduced is 15 phr wherein the impact strength increases 11.3% over that of the original resin, and the internal stress (T>Tg) reduces 11.8% over that of the original resin substrate.

Table 2 shows the pendulum impact strength of various epoxy resins introduced with different amounts of the polysiloxane urethane.

Table 2 clearly indicates that:
(1) When the epoxy resin substrate is DER-332 and the amount of the polysiloxane urethane introduced is 25 phr, the pendulum impact strength of the cured resin increases 35.5% over that of the original resin substrate.
(2) When the epoxy resin substrate is NPEL-128 and the amount of the polysiloxane urethane introduced is 10 phr, the pendulum impact strength of the cured resin increases 8.4% over that of the original resin substrate.
(3) When the epoxy resin substrate is NPEL-128s and the amount of the polysiloxane urethane introduced is 20 phr, the pendulum impact strength of the cured resin increases 9.9% over that of the original resin substrate.
(4) When the epoxy resin substrate is NPEL-1 34 and the amount of the polysiloxane urethane introduced is 5 phr, the pendulum impact strength of the cured resin increases 4.0% over that of the original resin substrate.
(5) When the epoxy resin substrate is ESCN-195XL and the amount of the polysiloxane urethane introduced is 10 phr, the pendulum impact strength of the cured resin increases 15.6% over that of the original resin substrate.

Table 3 shows the thermal expansion coefficient of various cured epoxy resins introduced with different amounts of the polysiloxane urethane.

TABLE 2

| Epoxy resin | | Amount of polysiloxane urethane introduced (phr) | | | | | |
|---|---|---|---|---|---|---|---|
| | | 0 | 5 | 10 | 15 | 20 | 25 |
| DER 332 | Impact strength (ft-lb/in) | 0.5853 | 0.7262 | 0.6963 | 0.7817 | 0.7620 | 0.7933 |
| NPEL 128 | Impact strength (ft-lb/in) | 0.7267 | 0.7225 | 0.7874 | 0.7434 | 0.7472 | 0.6562 |
| NPEL 128s | Impact strength (ft-lb/in) | 0.7507 | 0.7925 | 0.7485 | 0.7953 | 0.8249 | 0.6581 |
| NPEL 134 | Impact strength (ft-lb/in) | 0.7705 | 0.8010 | 0.7852 | 0.7992 | 0.7229 | 0.6517 |
| ESCN 195XL | Impact strength (ft-lb/in) | 0.5257 | 0.5631 | 0.6075 | 0.5849 | 0.5386 | 0.5378 |

TABLE 3

| Epoxy resin | Expansion coefficient | Amount of polysiloxane urethane introduced (phr) | | | | | |
|---|---|---|---|---|---|---|---|
| | | 0 | 5 | 10 | 15 | 20 | 25 |
| DER 332 | (T < Tg) | 79.3 | 83.20 | 76.78 | 77.39 | 76.06 | 96.69 |
| | (T > Tg) | 149.6 | 149.2 | 143.6 | 138.1 | 135.7 | 132.3 |
| NPEL 128 | (T < Tg) | 72.25 | 66.52 | 76.00 | 75.10 | 75.60 | 63.90 |
| | (T > Tg) | 153.6 | 155.8 | 142.0 | 136.0 | 145.0 | 139.0 |
| NPEL 134 | (T < Tg) | 72.8 | 69.00 | 66.50 | 57.50 | 62.40 | 65.80 |
| | (T > Tg) | 170.0 | 149.0 | 135.0 | 155.0 | 141.0 | 153.0 |
| ESCN 195XL | (T < Tg) | 217.1 | 316.3 | 212.9 | 228.9 | 257.2 | 265.5 |
| | (T > Tg) | 302.4 | 402.3 | 365.9 | 320.9 | 342.1 | 411.7 |

Table 3 clearly indicates that:

The thermal expansion coefficient of the cured DGEBA type epoxy resin DER-332 modified by different amounts of the polysiloxane urethane is not heavily influenced by the amount of the polysiloxane urethane introduced when the thermal expansion coefficient is measured at a temperature below the glass transition temperature, and is about 79.3 $\mu$m/m° C., however, the value will decrease along with an increase in the amount of the polysiloxane urethane introduced when the thermal expansion coefficient is measured at a temperature lower than the glass transition temperature.

Table 4 shows the internal stress of the cured resin substrates added with different amounts of the polysiloxane urethane when measured at a temperature higher (>Tg) or lower (<Tg) than the glass transition temperature.

TABLE 4

| Epoxy resin | | Amount of polysiloxane urethane introduced (phr) | | | | | |
|---|---|---|---|---|---|---|---|
| | | 0 | 5 | 10 | 15 | 20 | 25 |
| DER 332 | Internal stress (T < Tg) | 155.33 | 133.46 | 118.47 | 110.23 | 106.34 | 125.36 |
| | Internal stress (T > Tg) | 293.04 | 239.33 | 221.59 | 196.71 | 189.72 | 171.53 |
| NPEL 128 | Internal stress (T < Tg) | 150.66 | 131.69 | 149.39 | 136.82 | 130.50 | 99.84 |
| | Internal stress (T > Tg) | 320.30 | 308.44 | 279.12 | 247.76 | 250.30 | 217.19 |
| NPEL 134 | Internal stress (T < Tg) | 156.19 | 127.97 | 114.49 | 95340 | 98.00 | 94.81 |
| | Internal stress (T > Tg) | 364.74 | 276.34 | 232.43 | 257.18 | 221.44 | 220.46 |
| ESCN 195XL | Internal stress (T < Tg) | 533.98 | 737.55 | 476.90 | 467.76 | 399.12 | 372.31 |
| | Internal stress (T > Tg) | 743.78 | 938.08 | 819.62 | 655.76 | 530.87 | 577.33 | duced when the thermal expansion coefficient is measured at a temperature higher than the glass transition temperature. The thermal expansion coefficients of the cured DGEBA type epoxy resin NPEL-128 and NPEL-134 modified by different amounts of the polysiloxane urethane will invariably decrease along an increase in the amount of the polysiloxane urethane introduced regardless of the measurement being carried out at a temperature that is higher or lower than the glass transition temperature.

The thermal expansion coefficient of the cured novolac type epoxy resin ESCN-195XL modified by different amounts of the polysiloxane urethane will decrease along with an increase in the amount of the polysiloxane urethane (1) When the epoxy resinsubstrate is DER-332 and the amount of the polysiloxane urethane introduced is 25 phr, the measured internal stress of the cured resin decreases 19.3% over that of the original resin substrate when the measurement is carried out at a temperature lower than the glass transition temperature, and decreases 41.5% over that of the original resin substrate when the measurement is carried out at a temperature higher than the glass transition temperature. (2) When the epoxy resin substrate is NPEL-128 and the amount of the polysiloxane urethane introduced is 25 phr, the measured internal stress of the cured resin decreases 33.7% over that of the original resin substrate when the measurement is carried out at a temperature lower than the glass transition temperature, and decreases 32.2% over that of the original resin substrate when the measurement is carried out at a temperature higher than the glass transition temperature. (3) When the epoxy resin substrate is NPEL- 134 and the amount of the polysiloxane urethane introduced is 25 phr, the measured internal stress of the cured resin decreases 39.3° C. over that of the original resin substrate when the measurement is carried out at a temperature lower than the glass transition temperature, and decreases 40.0% over that of the original resin substrate when the measurement is carried out at a temperature higher than the glass transition temperature. (4) When the epoxy resin substrate is ESCN-195XL and the amount of the polysiloxane urethane introduced is 25 phr, the measured internal stress of the cured resin decreases 30.3% over that of the original resin substrate when the measurement is carried out at a temperature lower than the glass transition temperature, and decreases 22.4% over that of the original resin substrate when the measurement is carried out at a temperature higher than the glass transition temperature.

The above results indicate that:

(1) For improving the flexibility of the DGEBA type epoxy resin DER-332 modified by the polysiloxane urethane and reducing the internal stress thereof, the optimum amount of the polysiloxane urethane introduced is 5 phr wherein the impact strength increases 24.1% over that of the original resin, and the internal stress (T>Tg) reduces 18.3% over that of the original resin substrate.

(2) For improving the flexibility of the DGEBA type epoxy resin NPEL-128 modified by the polysiloxane urethane and reducing the internal stress thereof, the optimum amount of the polysiloxane urethane introduced is 10 phr wherein the impact strength increases 8.4% over that of the original resin, and the internal stress (T>Tg) reduces 12.9% over that of the original resin substrate.

(3) For improving the flexibility of the DGEBA type epoxy resin NPEL-128s modified by the polysiloxane urethane and reducing the internal stress thereof, the optimum amount of the polysiloxane urethane introduced is 5 phr wherein the impact strength increases 5.6% over that of the original resin.

(4) For improving the flexibility of the DGEBA type epoxy resin NPEL-134 modified by the polysiloxane urethane and reducing the internal stress thereof, the optimum amount of the polysiloxane urethane introduced is 10 phr wherein the impact strength increases 1.9% over that of the original resin, and the internal stress (T>Tg) reduces 36.3% over that of the original resin substrate.

(5) For improving the flexibility of the Novolac type epoxy resin ESCN-195XL modified by the polysiloxane urethane and reducing the internal stress thereof, the optimum amount of the polysiloxane urethane introduced is 15 phr wherein the impact strength increases 11.3% over that of the original resin, and the internal stress (T>Tg) reduces 11.8% over that of the original resin substrate.

What is claimed is:

1. A modifier for improving the flexibility of a cured epoxy resin, which has the following chemical formula (1):

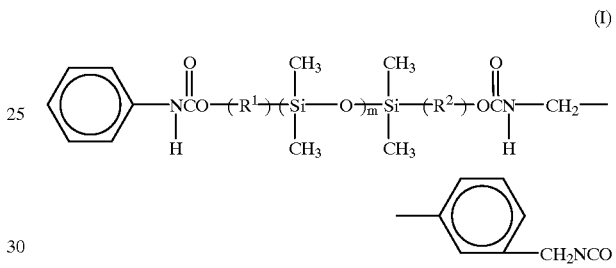

wherein:

m is an integer of 0<m<10;

$R^1$=an alkyl having 1~7 carbons;

$R^2$=an alkyl having 1~7 carbons.

2. The modifier as claimed in claim 1 wherein m=5, $R^1$ and $R^2$ are $-(CH_2)_6-$.

3. An epoxy resin having a polysiloxane urethane-modifying group, wherein the epoxy resin has the following chemical structure (II):

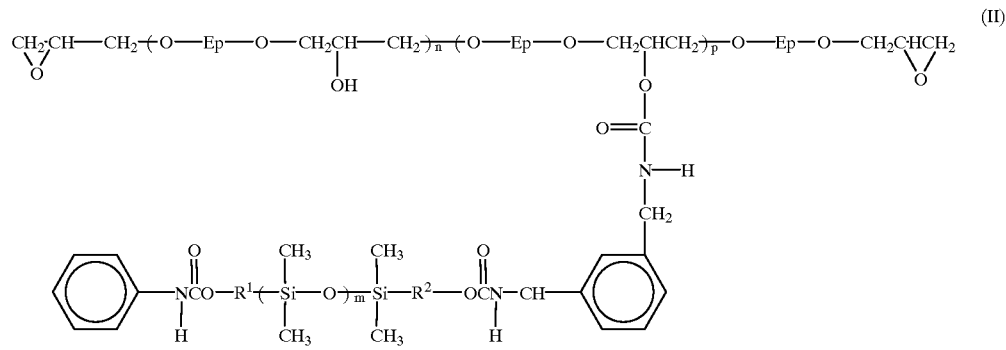

where:

m is an integer of 0<m<10, p/n is between $^1/_{100}$ and $^{25}/_{100}$, and 0<n, p<1;

$R^1$ is an alkyl having 1~7 carbons;

$R^2$ is an alkyl having 1~7 carbons;

Ep is

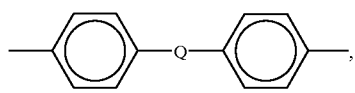

where

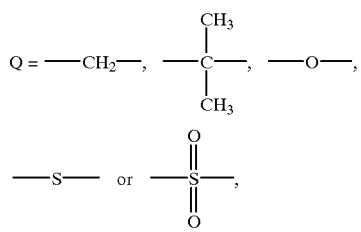

or Ep is a novolac-type epoxy resin group having the following formula

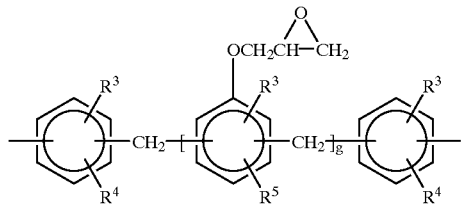

Where $R^3$ is hydrogen or methyl, g is an integer of 1 to 6, $R^4$ and $R^5$ independently are hydrogen or

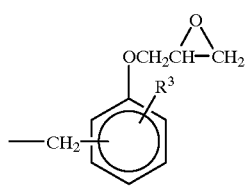

where $R^3$ has a same definition as the above.

4. The epoxy resin as claimed in claim 3 wherein m=5, $R^1$ and $R^2$ are —$(CH_2)_6$—.

5. The epoxy resin as claimed in claim 4 wherein Q is —$C(CH_3)_2$—.

6. The epoxy resin as claimed in claim 4 wherein Ep is a novolac type epoxy resin having the following formula:

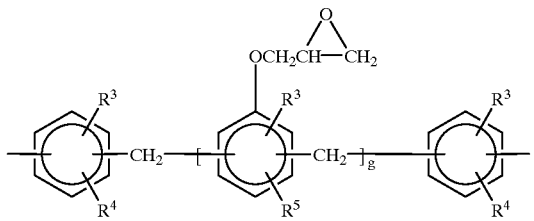

where $R^3$ is hydrogen or methyl, g is an integer of 1 to 6, $R^4$ and $R^5$ independently are hydrogen or

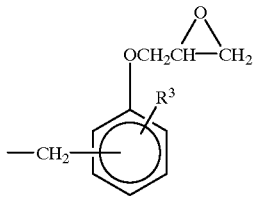

where $R^3$ has a same definition as the above.

7. A method of preparing an epoxy resin having a polysiloxane urethane-modifying group, which comprises reacting a modifier as claimed in claim 1 with an epoxy resin of the following formula (III) in a molten state:

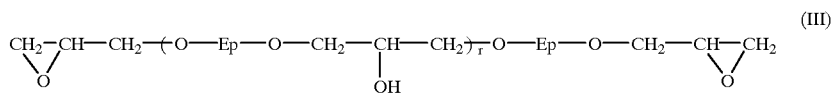

(III)

where:

0<r<1;

Ep is

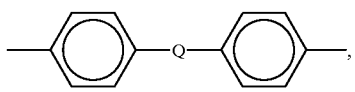

where

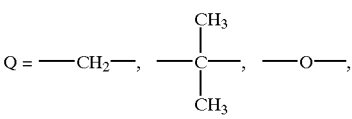

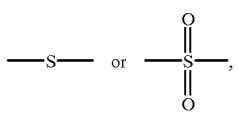

or Ep is a novolac-type epoxy resin group having the following formula

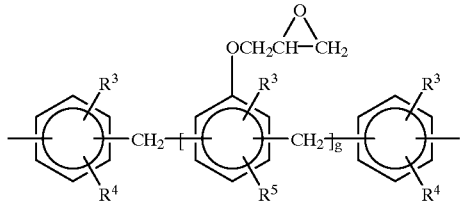

where $R^3$ is hydrogen or methyl, g is an integer of 1 to 6, $R^4$ and $R^5$ independently are hydrogen or

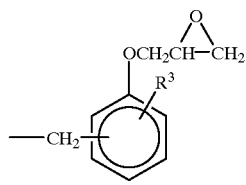

where $R^3$ has a same definition as the above.

8. The method as claimed in claim 7 wherein the reaction is carried out under an atmosphere of an inert gas.

9. The method as claimed in claim 7 wherein the reaction is carried out at a temperature of 80° C.–120° C.

10. The method as claimed in claim 7 wherein the modifier is reacted with the epoxy resin (III) in an amount of 1 to 30 parts by weight of the modifier per 100 parts by weight of the epoxy resin (III).

* * * * *